May 19, 1964
G. H. MADANY
3,133,880
CENTRIFUGAL EXTRACTOR
Filed Dec. 21, 1959
6 Sheets-Sheet 1
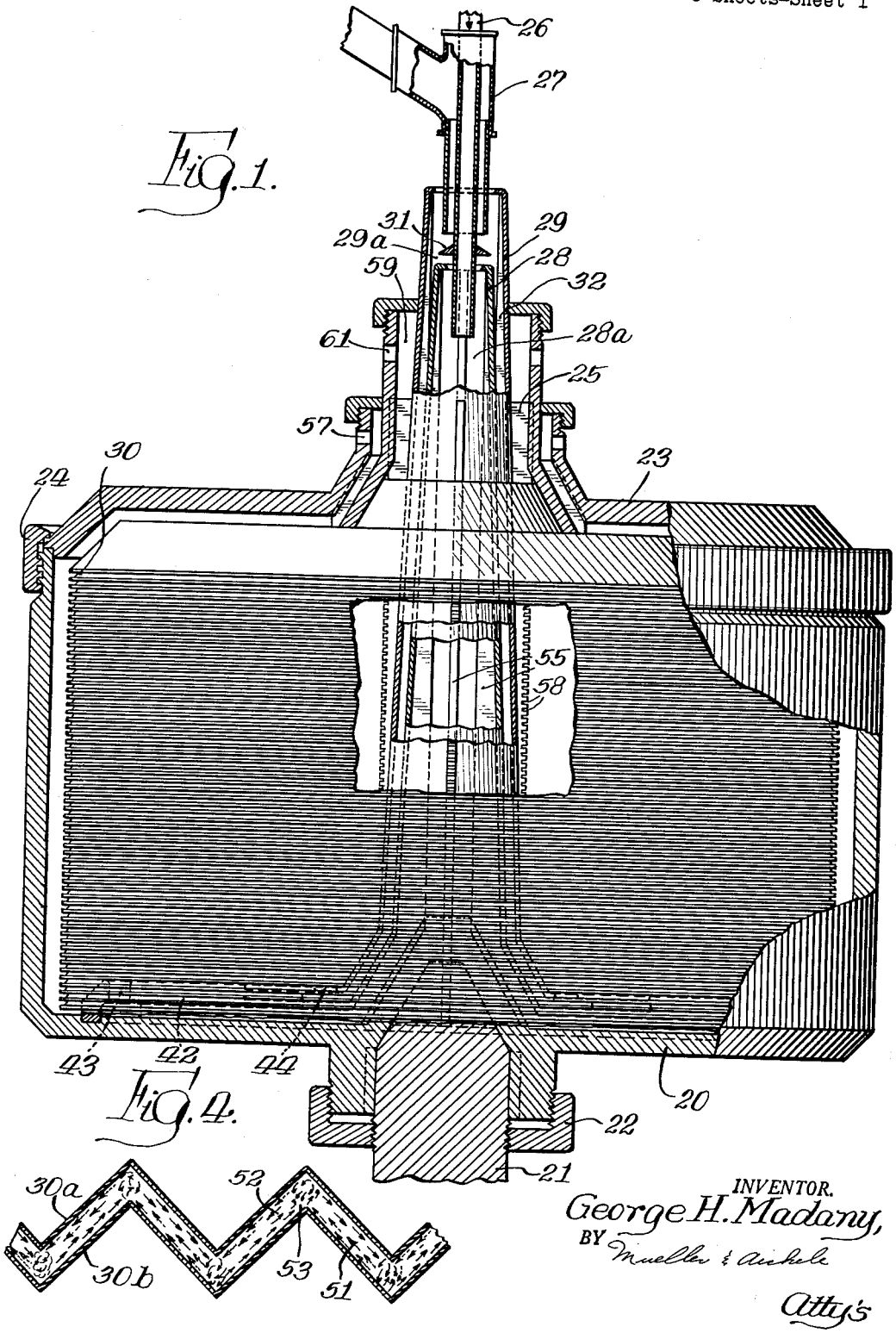
INVENTOR.
George H. Madany,
BY Mueller & Aichele
Attys

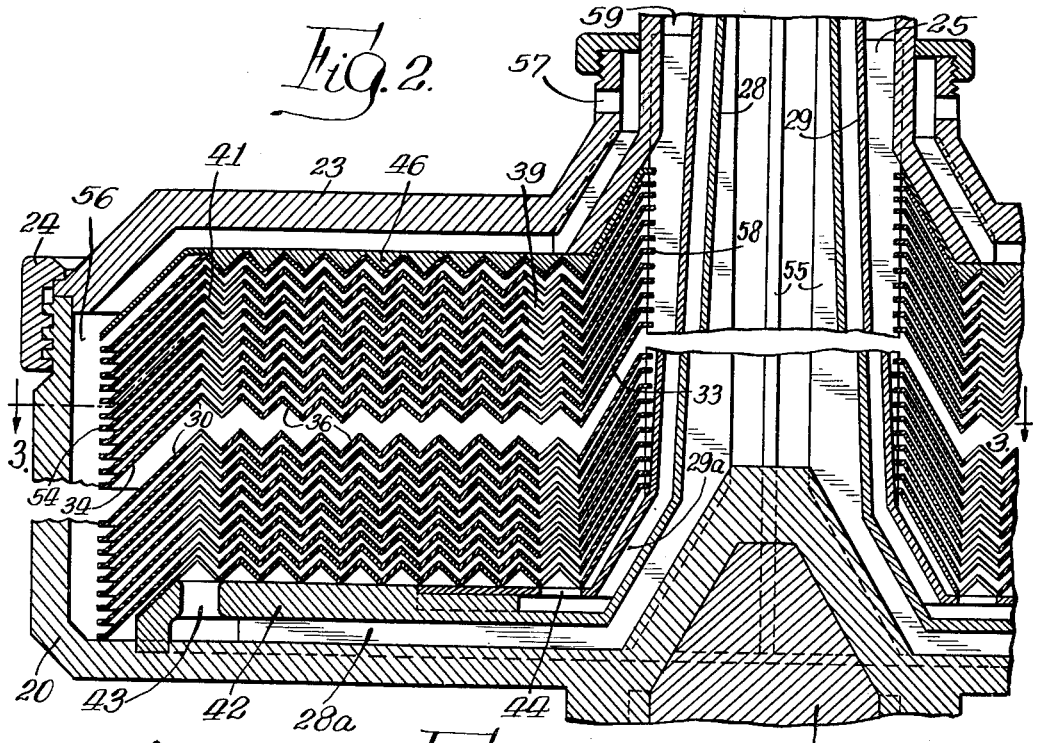
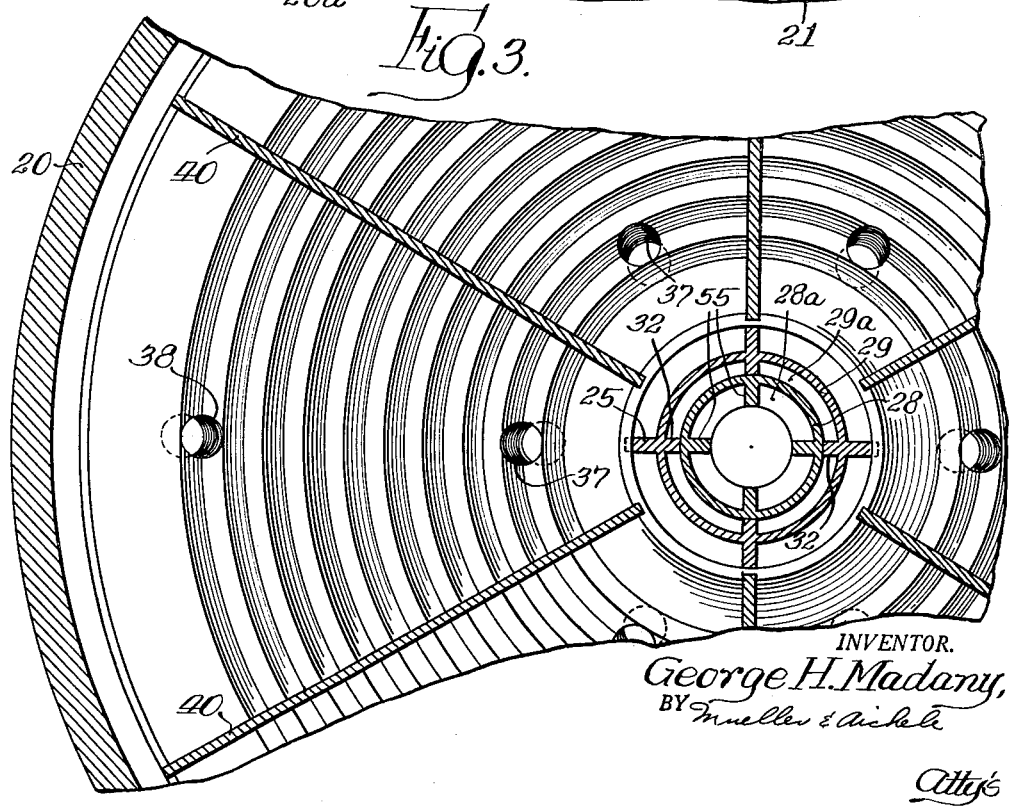

May 19, 1964   G. H. MADANY   3,133,880
CENTRIFUGAL EXTRACTOR
Filed Dec. 21, 1959   6 Sheets-Sheet 3

INVENTOR.
George H. Madany
BY
Mueller & Aichele
Atty's

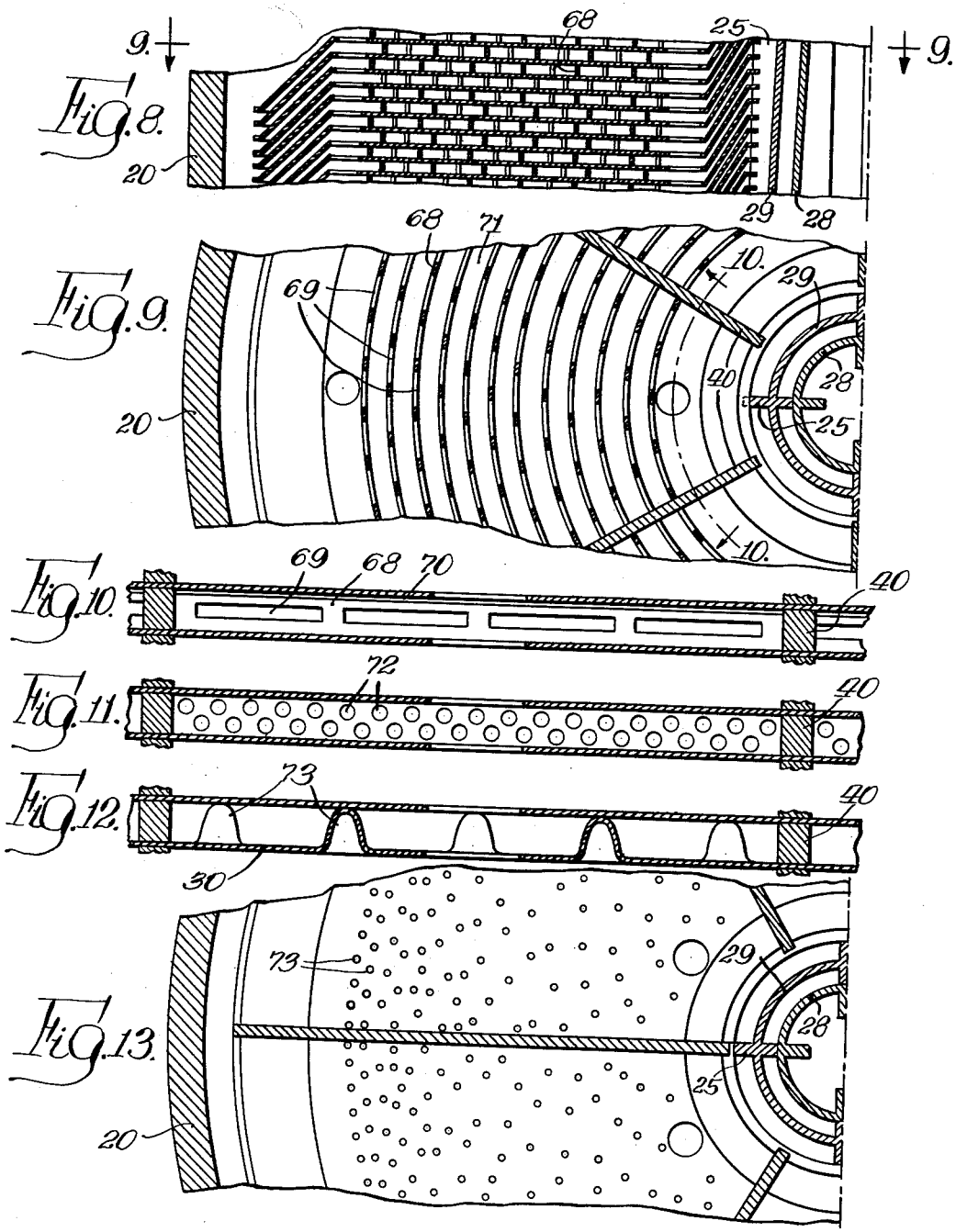

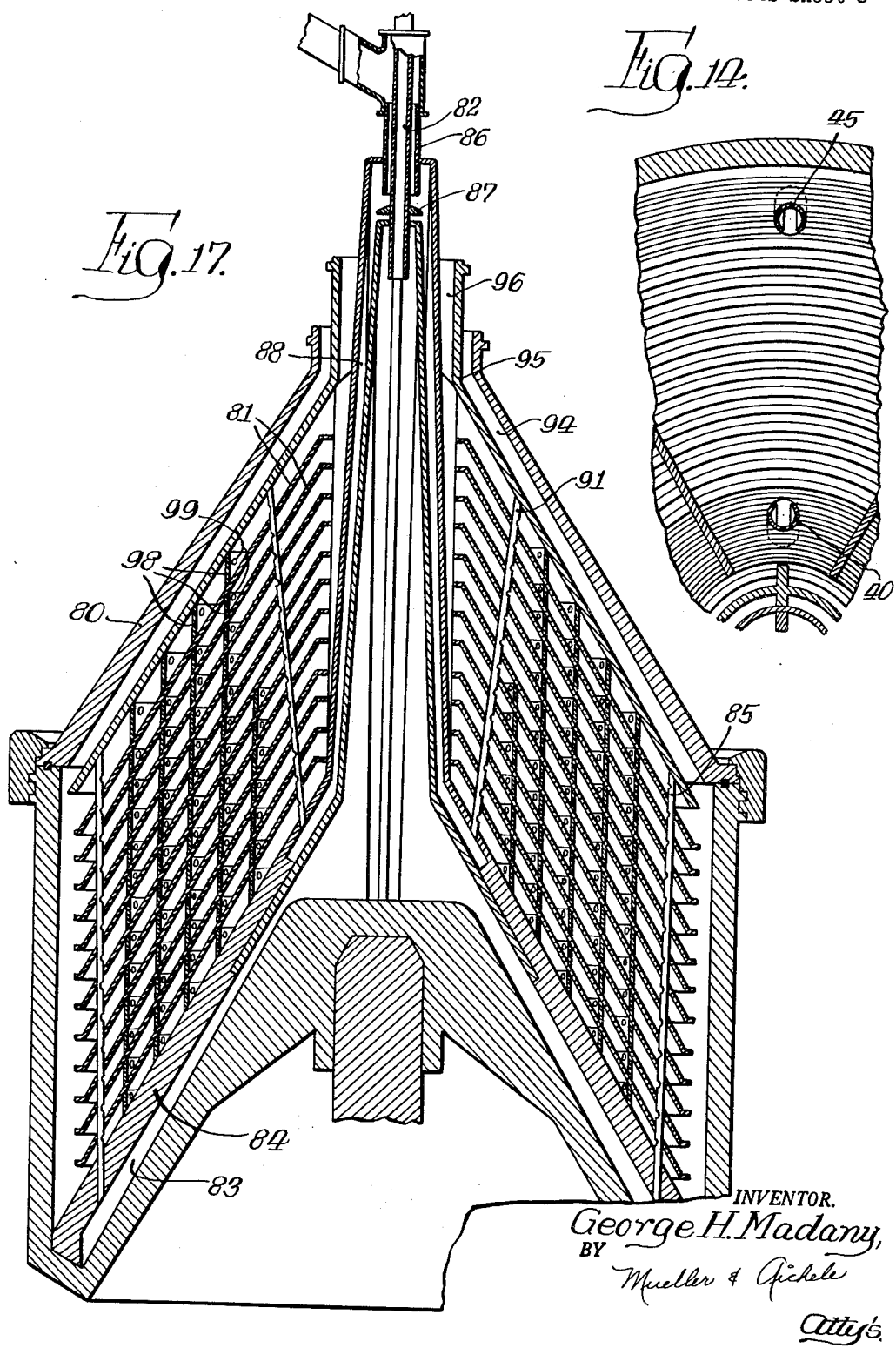

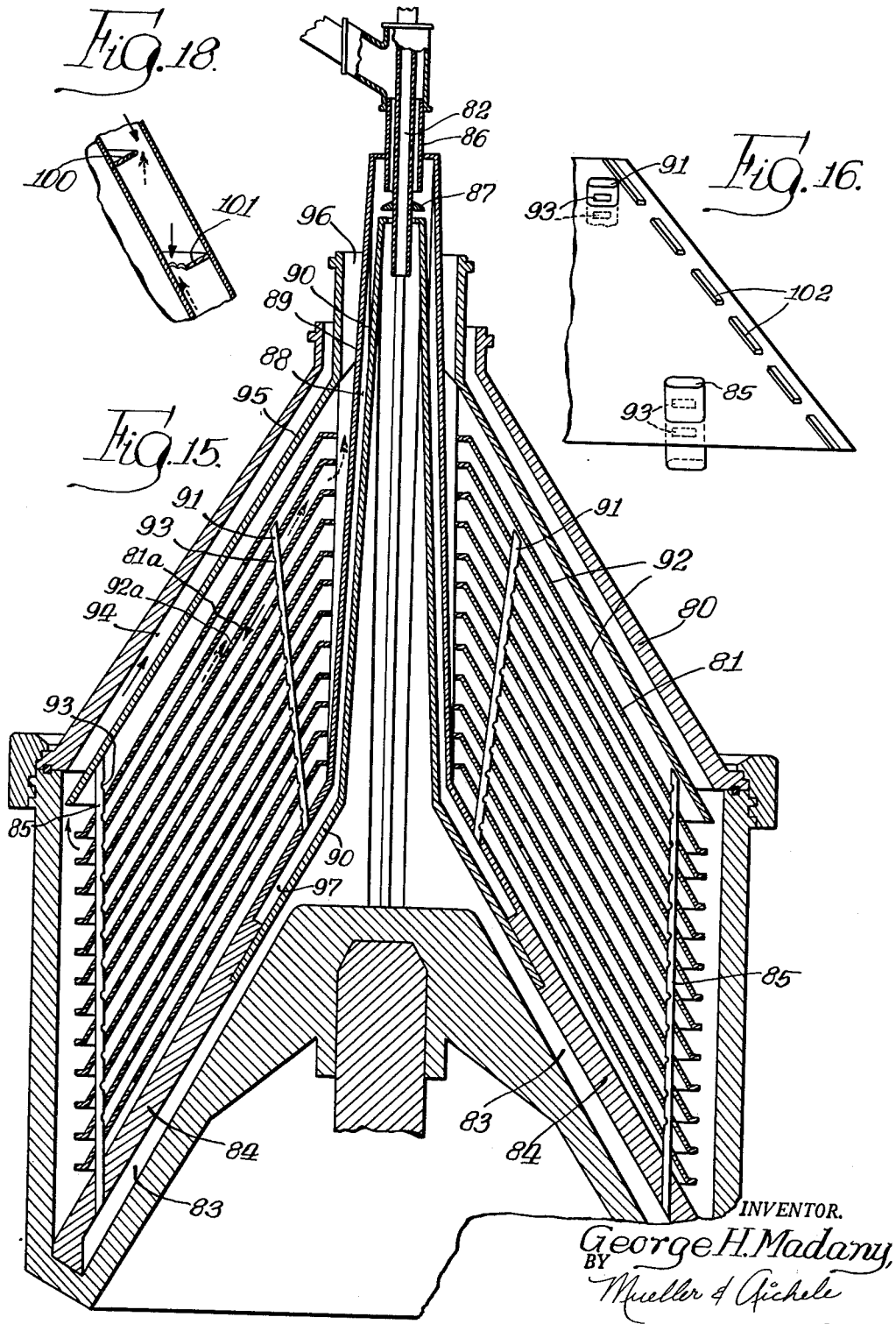

United States Patent Office 3,133,880
Patented May 19, 1964

3,133,880
CENTRIFUGAL EXTRACTOR
George H. Madany, Rte. 31, Macedon, N.Y., assignor of one-fourth to Vernon D. Jarvis, Decatur, Ill.
Filed Dec. 21, 1959, Ser. No. 861,420
6 Claims. (Cl. 233—15)

This invention relates to centrifugal countercurrent contact apparatus for effecting intimate contact between immiscible or partly immiscible liquids of different densities and more particularly to contact apparatus providing a large number of separate mixing and separating stages within a compact space. This application is a continuation in part of application Serial No. 776,823, filed November 28, 1958, now abandoned.

In many industrial operations it is necessary to contact intimately two immiscible or partially immiscible liquids of different densities and subsequently separate them. This may be done to promote a chemical reaction between the liquids or to transfer one or more components from one liquid to the other, as in the case of liquid-liquid extraction. It is well known that the efficiency of such operations is greatly increased when the mixing and separation is repeated several times as in a multi-stage device.

Intimate contact and therefore efficient extraction is promoted by turbulent flow of the liquid components. However, intimate mixing and turbulence tends to lengthen the time required for separation of the liquid reaction products or spent liquids. For this reason, it is desired that devices promoting turbulent mixing be combined with means providing strong separating forces. Moreover, such a combination allows the use of liquids which could not be handled with devices relying on gravity alone for separation. Thus, a liquid might be economically desirable for use to extract a certain component from another liquid, but might have a density too near to the density of the latter, to be effective in the more conventional extraction devices. Or, a liquid, sensitive to radiation but very desirable otherwise, might be usable to extract a radio-active component in an extractor requiring a short residence time, but would be impracticable otherwise.

In centrifugal separators a force equal to many thousands of times that of gravity may be generated so that relatively fast separation is possible. However, the provision of separate mixer and separator stages is expensive and requires large apparatus, and the overall through-put per unit volume or power used, is relatively low. Attempts have been made to carry out mixing and separating simultaneously with centrifugal devices but these have not been entirely satisfactory because they fail to provide a multistage series of effective mixing and separating sections with a high rate of throughput, or because they are unduly complicated mechanically.

It is an object of the present invention, therefore, to provide a liquid-liquid contact apparatus of relatively simple mechanical construction which combines a high rate of through-put with intimate contact and fast separation of the liquid components.

It is a further object of the invention to provide liquid-liquid contact apparatus which provides multi-stage mixing and separation in a relatively compact structure and which requires only a short residence time.

It is another object of the invention to provide a centrifugal countercurrent contact apparatus for liquids of different densities with efficient means for promoting turbulence and intimate mixing of the liquids and with means providing strong separation forces to reduce contact time between the reaction or extraction products.

A feature of the present invention is the provision of a centrifugal combined mixer and separator having a plurality of spaced plates within the working or contacting space thereof, with means formed on the surfaces of the plates to promote turbulence and intimate mixing of liquid streams of different densities as they move countercurrent to one another through the space between the plates.

A further feature of the invention is the provision of a centrifugal mixer and separator having frusto conical discs with openings therein through which light and heavy liquids pass in opposite directions for mixing, with spaces between the openings forming separating zones. Rings may be provided between the discs forming mixing zones, or the radial guide vanes may be discontinuous to promote mixing and turbulence by allowing the heavy liquid to slip behind and the light liquid to run ahead of the velocity of the disc at the zones of discontinuity.

Another feature of the invention is the provision of a centrifugal mixer having spaced plates with a series of corrugations thereon defining a tortuous path between each pair of adjacent plates, and with mixing zones formed at each point of change of direction of the path so that a number of distinct mixing stages are provided within each path.

A still further feature of the invention is the provision of such a mixer and separator wherein radially spaced holes are provided in the aforementioned plates to form channels for movement of light and heavy liquids into the spaces between the plates. The channels may be defined by channel shaped distributors positioned in the openings, and in a preferred embodiment of the invention these channels are inclined with respect to the axis of rotation of the rotating bowl with which the plates are positioned in order to provide a component of force impelling liquids upwardly through the openings so that mixing may take place in the spaces between the adjacent plates. This results in maximum use of the radial space for countercurrent flow providing mixing and separation.

Another feature of the invention is the provision of a centrifugal mixer having plates with circular ridges extending alternately from the surfaces of adjacent plates to define a tortuous path reversing direction at each ridge with the heavy and light liquids flowing countercurrent through the path and being mixed at each reversal of direction.

In the accompanying drawings:

FIG. 1 is a side elevation view partly broken away and partly in section showing the structure of a centrifugal liquid contacting device in accordance with the present invention;

FIG. 2 is a fragmentary view in vertical section of the embodiment illustrated in FIG. 1 showing the generally disc-shaped configuration of the plates within the bowl member;

FIG. 3 is a view taken in section on the line 3—3 of FIG. 2;

FIG. 4 is a diagrammatic illustration showing the flow path of light and heavy liquids in the spaces between adjacent plates;

FIG. 8 is a fragmentary view in vertical section showing still another plate configuration in accordance with a still further embodiment of the invention;

FIG. 9 is a view taken in section on the line 9—9 of FIG. 8;

FIG. 10 is a view in section taken on the line 10—10 of FIG. 9;

FIG. 11 is a view similar to FIG. 10 but showing an alternate distribution of opennigs within the member illustrated in FIG. 10;

FIG. 12 is a view in vertical section through a plate in accordance with another embodiment of the invention having protruding bosses formed on the surface of the plates;

FIG. 13 is a plan view showing the distribution of the protruding bosses illustrated in FIG. 12 across the surface of a typical plate;

FIG. 14 shows one form of the distributing channels which may be used with the structure of FIGS. 1–4;

FIG. 15 illustrates an embodiment of the invention having frusto conical discs with apertures therein;

FIG. 16 shows another form of distributing channels with a disc having discontinuous radial guiding vanes thereon;

FIG. 17 illustrates an embodiment with apertured rings between frusto conical discs; and FIG. 18 shows alternate forms of the rings between discs.

Figure 5:
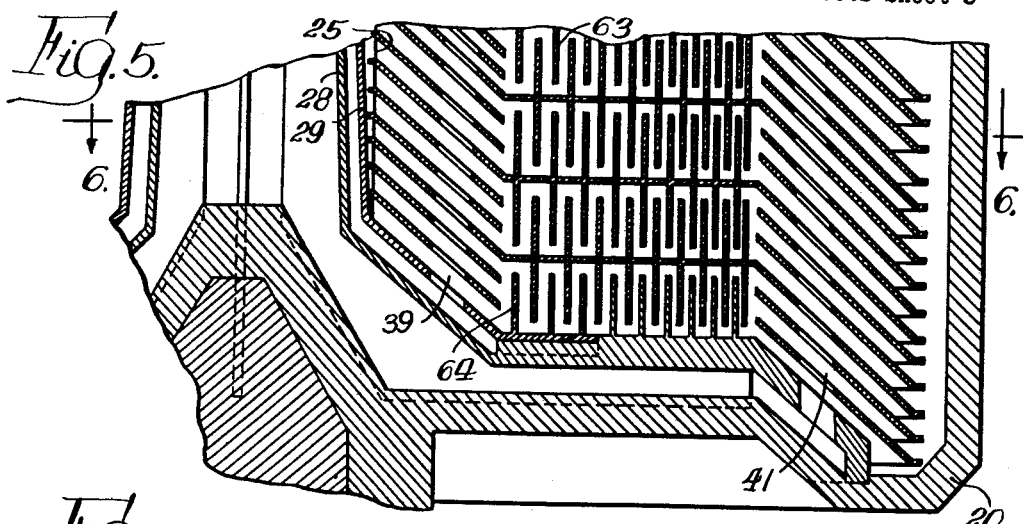
FIG. 5 is a fragmentary view in vertical section illustrating the plate configuration in accordance with a different embodiment of the invention.

The centrifugal countercurrent liquid contact apparatus of the present invention includes a rotatable bowl or rotor having an interior working space and means for rotating the bowl about a central axis. A plurality of rotatable spaced apart plates or discs are positioned within the bowl and extend in a direction outwardly from the axis of rotation. A plurality of openings in the plates are aligned to provide at least two channels through the plate assembly, with one channel being relatively close to the axis of rotation and the other relatively remote therefrom. A liquid distributor introduces light liquid adjacent one end of the channel remote from the axis and heavy liquid adjacent one end of the other channel close to the axis. On rotation of the bowl the liquids flow countercurrent to one another through the spaces between adjacent plates. Means are provided on the surfaces of the plates or discs for promoting turbulence within the flowing liquids and to provide a plurality of separate mixing and separating sections so that intimate contact takes place while a high rate of liquid throughput is obtained. This may be provided by corrugations in the plates or by means secured thereto and projecting from the surface thereof. The discs may be frusto conical with openings therein through which the light and heavy liquids flow in opposite directions to produce mixing. The radial guiding vanes may be discontinuous to accelerate the heavy liquid and decelerate the light liquid to create turbulence and mixing.

FIG. 1 of the accompanying drawings shows the general organization of the present invention which includes a generally cup-shaped bowl member or rotor 20 rotatably coupled to the spindle 21 by the spindle nut 22. The mouth of the bowl is covered with a cover member 23 which is secured to the bowl by the coupling member 24.

Light liquid is introduced into the apparatus through the stationary light liquid intake tube 26 which is concentric with the axis of rotation of the bowl and which is surrounded by the heavy liquid intake tube 27. The intake tube 26 extends into one end of the light liquid distributor member 28. The heavy liquid distributor member 29 surrounds the light liquid distributor member 28 so that they form a pair of essentially annular conduits or chambers 28a and 29a for light and heavy liquids respectively. (See FIG. 3.) A cone 31 is attached to the light liquid tube 26 to deflect heavy liquid and direct the same into the heavy liquid distributor chamber 29a. Guide vanes 32 extend inwardly from member 29 and impart rotary motion to the liquid in chamber 29a on rotation of bowl 20 since both members 28 and 29 rotate with the bowl. Similar vanes 55 extend inwardly from member 28 into the light liquid distributor chamber 28a for guiding and impelling the light liquid.

An assembly of plates or discs 30 (best shown in FIG. 2) are positioned within the bowl 20 vertically spaced from one another and extending generally radially from the axis of rotation of the bowl. Each plate is keyed at its inner edge to the vanes 25 which extend radially outward from the member 29 (FIG. 3) and are rotatable therewith. Each of the plates 30 is shaped to have an inner conical portion 33 close to the axis of rotation and an outer conical portion 34 remote therefrom. In the embodiment particularly illustrated in FIG. 2 each of the plates 30 has a corrugated intermediate portion 36. Radial guide vanes 40 (FIG. 3) space adjacent plates from one another and serve to direct liquid flow as will be explained subsequently.

Each of the plates 30 is formed with an inner ring of openings 37 (FIG. 3) and an outer ring of openings 38. The openings in the discs are so aligned as to form a pair of channels 39 and 41 (FIG. 2) extending through the plate assembly. The alignment of the openings is such that the inner channel 39 is inclined upwardly and away from the central axis of rotation while the outer channels 41 are inclined upwardly and toward such axis. In a particular embodiment shown there are six inner channels 39 and six outer channels 41 although it will be understood that a different number may be provided.

The distributing channels 39 and 41 provided by the openings 37 and 38 of the discs as shown in FIGS. 1–4, and by similar openings in the discs or plates of the other embodiments, may be more clearly defined by use of channel members as shown in FIG. 14. The inner channel member 40 distributes the heavy liquid and the outer channel member 45 distributes the light liquid. The channels are inclined as previously described, with the inner channel 40 being inclined outwardly as it extends upwardly and the outer channel 45 being inclined inwardly as it extends upwardly.

A liquid distributor generally indicated in FIG. 2 by reference character 42 is connected to the members 28 and 29 and is attached to the bottom of bowl 20 for rotation therewith. An opening 43 in the distributor is positioned adjacent the lower end of the channel 41 so that this channel communicates with the light liquid distributor chamber 28a. Similarly, the opening 44 in the distributor 42 is positioned adjacent the lower end of channel 39 and communicates with the heavy liquid distributor chamber 29a so that heavy liquid is supplied at the end of this channel by the pumping of liquids into the apparatus. A solid plate 46 without openings formed therein extends across the top of the plate assembly and closes the upper ends of the channels 39 and 41.

The operation of the apparatus as a combination mixing and separating device will be described on the basis of the space within the bowl 20 being filled with liquid. A light liquid, for example, a solvent, is introduced through the tube 26 into the light liquid distributor chamber 28a while a heavy liquid containing, for example, a substance to be extracted therefrom by the solvent is introduced through the intake tube 27 and is deflected by the cone 31 to the heavy liquid distributor chamber 29a. The bowl 20 is rotated by the action of the spindle 21 to provide desirable centrifugal force on the liquid within the bowl. The distributor members 28 and 29, plates 30 and distributor 42 rotate with the bowl. The light liquid flows through the distributor chamber 28a and is discharged at the opening 43 to the lower end of the outer channel 41. Heavy liquid similarly flows through the distributor chamber 29a and is discharged through the opening 44 at the end of the inner channel 39. The pumping pressure on the two intake liquids tends to force them to rise through their respective channels. In addition the rotation of the bowl 20 provides centrifugal force tending to impell the heavy liquid toward the periphery of the plates and the light liquid toward the central axis of rotation. The inclination of the channels 39 and 41 toward the direction in which the liquids rising in them are impelled by this centrifugal force also tends to force them upwardly through the channels. The angles of inclination of the channels are chosen so that the upward force will balance the frictional force created by the liquids rising in the channels.

The centrifugal force generated by rotation of the bowl 20 impells the heavy and light liquids to flow through the spaces between adjacent plates 30 as films and countercurrent to one another. The corrugations formed in the intermediate portions 36 of these plates provide for very effective mixing as will now be explained.

FIG. 4 shows a part of the intermediate or corrugated portions of two representative plates designated as 30a and 30b. The dotted lines represent the flow path of heavy liquid from the opening 39 toward the conical portion 34 while the solid lines represent the flow path of the light liquid from the channel 41 inwardly toward the conical separators 33. Because the centrifugal action of the bowl tends to impel the heavy liquid outwardly, it will seek the region in the flow path that is more remote from the axis while the inwardly impelled light liquid will seek the flow path closer to the axis. This is illustrated in FIG. 4 which shows how the corrugated plates define a plurality of short straight line flow paths such as 51 and 52. In the path 51 the light liquid tends to form a film adjacent the upper plate 30a while the heavy liquid forms a film adjacent the lower path 30b since in the flow path 51, plate 30a is closer to the axis of rotation and 30b is more remote. The two liquids thus form two layers flowing countercurrent across one another and extraction takes place at their interface.

Because the plates 30 are corrugated they define a zigzag flow path in the space between them with this path changing direction periodically. The change of direction of path produces a mixing zone such as the one designated by reference character 53 between the straight portions 51 and 52. In the portion 53 the positions of plates 30a and 30b with respect to their relative distances from the axis of rotation are reversed with respect to portion 51. That is, plate 30a is now more remote from the axis of rotation and plate 30b closer to it. Because of the aforementioned tendency of the heavy liquid to form a film adjacent the more remote plate and the light liquid to form a film adjacent the nearer plate, a mixing action takes place in the zone 53. In this zone small quantities of the heavy and light liquids are thoroughly mixed because they are forced to flow through one another. This results in very intimate contact. It will be evident that a very large number of corrugations and hence of separate mixing zones such as 53 may be provided within a relatively compact space so that there may be a large number of separate mixing stages and intermediate separating stages. This has the advantage of providing multistage operation and greatly improving the efficiency of contacting. As indicated in FIG. 4 there is substantial turbulence between the liquids induced in the mixing zones 53.

It may be desired in certain applications to provide perforated ridges at the apices of the zig-zag path to increase the mixing action. These may be constructed as the ridges 68 in FIGS. 10 or 11 or the rings 100 or 101 in FIG. 18. The radial guide vanes 40 (FIG. 3) act as separators between adjacent plates and channel the liquid flow much in the manner of vanes used in disc-type separators.

After being impelled outwardly beyond the intermediate corrugated portion 36 the heavy liquid passes to the conical separator portion 34 where it is separated from entrained light liquid by the usual conical separator action. The liquid pours over the lips 54 into the spent heavy liquid discharge space 56 (FIG. 2) and is forced therethrough and discharged through the annular outlet port 57. Similarly the inwardly impelled liquid is forced to the inner conical separator portion 33 where it is separated from entrained heavy liquid and discharged over the lips such as 58 into the spent light liquid discharge chamber 59 which communicates with the spent light liquid outlet 61 as best shown in FIG. 1.

The optimum angle and amplitude of the corrugations formed in the intermediate portions of the plate 30 depends upon the characteristics of the liquids being contacted. The greater the amplitude of each corrugation, the greater separating action in each of the straight paths such as 51 and 52. Thus, a relatively high corrugation amplitude will be employed in application involving liquids having a tendency to form emulsions that are difficult to break or where the specific gravities of liquids differ but little. An increase in the lengths of straight paths likewise improves separation but reduces the number of separate mixing stages per unit of radial length of plates for a given corrugation angle.

Figure 6:
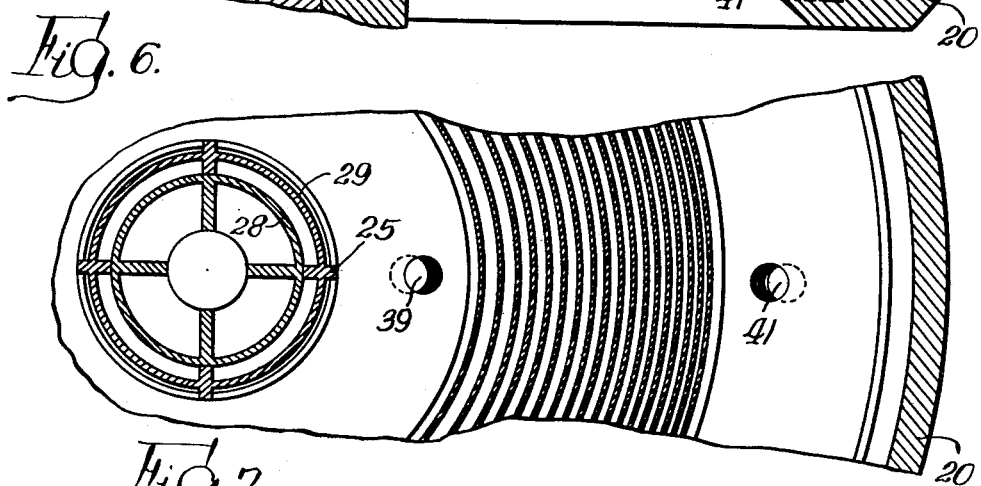
FIG. 6 is a view in section taken on the line 6—6 of FIG. 5.
Figure 7:
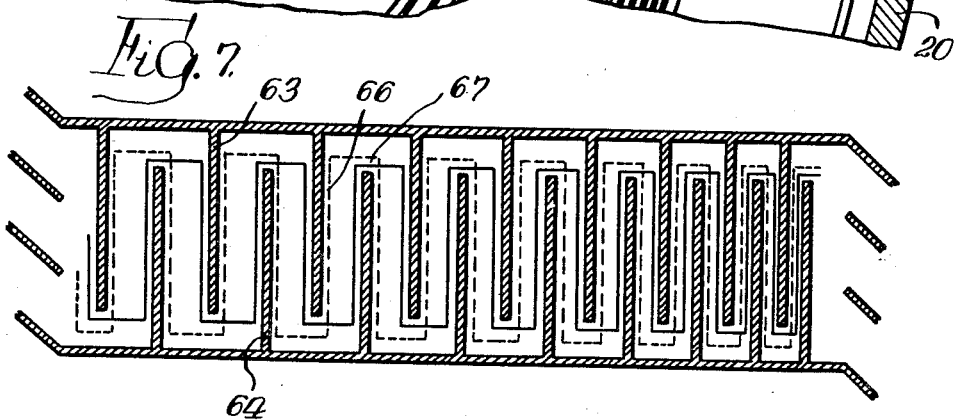
FIG. 7 is a diagrammatic illustration showing the flow patterns of light and heavy liquids within the space between adjacent plates in the embodiment illustrated in FIG. 5.

FIGS. 5, 6 and 7 illustrate an embodiment of the invention wherein somewhat different means are used to provide the turbulence and improved multi-stage mixing effect. The embodiment shown in these figures is of the same general organization as the embodiment previously described except that the plates 30 are generally horizontal and have mounted thereon the circular ridge members 63 and 64. As shown in FIGS. 5 and 7, the particular ridges 63 extend from both sides of each plate 30 and are staggered and interleaved with one another to provide a tortuous path best illustrated in FIG. 7, which path changes direction by 180° in flowing over or under each ridge. Preferably, the ridges are progressively more closely spaced remote from the axis of rotation of the device. The channels 39 and 41 in this embodiment are formed in the conical separator portions 33 and 34 respectively rather than in the intermediate portion of the discs.

Operation of this embodiment of the invention is similar to the embodiment shown in FIGS. 1–4. Heavy liquid rises through the channel 39 and is impelled away from the axis of rotation by the whirling action of the bowl 20. Similarly, the light liquid rises through the channel 41 and is impelled in a countercurrent direction into the various spaces between the plates 30. FIG. 7 shows diagrammatically the flow paths of the liquids in the space between adjacent plates. The dotted lines represent the flow path of the inwardly flowing light liquid and the solid lines indicate the flow path of the outwardly flowing heavy liquid. The interleaving circular ridges 63 and 64 define a tortuous path in the space between the plates 30 with the path being made up of a plurality of straight portions such as 66. In such a straight portion the heavy liquid will form a film adjacent the circular ridge further from the axis of rotation while the light liquid will form a film adjacent the ridge nearer the axis of rotation. At each reversal of direction of the tortuous path there is formed a mixing zone such as 67 wherein the streams for film of heavy and light liquid are forced to flow through one another in order to follow the aforementioned pattern.

It will be appreciated that this embodiment also provides a plurality of separate mixing stages so that there is a multistage operation in a relatively compact space. After mixing, separation takes place in the conical separator regions 33 and 34 and the spent liquids are discharged as in the other embodiment.

A plurality of mixing and separating regions may be provided by causing the components to flow through means extending between the plates which produce turbulence. This sets up a series of regions of turbulent mixing of the components. Thus, in the embodiment shown in FIGS. 8, 9 and 10, the turbulence producing means in the form of circular ridges 68 extend from one of the plates 30 towards the next adjacent plate. Slot-like openings 69 in the ridges provide liquid paths, with the liquids being mixed as they pass through the openings. A clearance 70 is provided between the ridges 68 and the adjacent plate which is less than the width of the slot-like openings 69. The annular spaces 71 serve as separating chambers for the inwardly impelled light liquid and the outwardly impelled heavy liquid. Circular openings such as 72 shown in FIG. 11 may be substituted for the angularly staggered slits 69 of FIGS. 8, 9 and 10.

In still another alternative embodiment, shown in FIGS. 12 and 13, turbulent mixing is provided by means of round protuberant bosses 73 formed in the surface in each of the plates 30 and extending to the next adjacent plate. These bosses are provided in the intermediate portion of the plates between the conical separator portions 33 and 34. The counter-current liquid streams in the spaces between the plates are deflected by contact with the bosses so that turbulent mixing zones are created. This embodiment is particularly useful in connection with the treatment of liquids which may contain some solids since the solids will not become stuck on the rounded bosses but at the same time adequate turbulence is obtained. The radial regions between bosses serve as separation zones for the light and heavy components. As shown in FIG. 12, the spacing between adjacent bosses may be made closer at greater distances from the central axis of rotation. Operation of this embodiment and those described in connection with FIGS. 8 through 11 is generally the same as the other embodiments described except for the particular means of providing turbulence in mixing in the spaces between the adjacent plates 30.

In FIG. 15 there is illustrated another embodiment of the extractor in accordance with the invention, which is of extremely simple and inexpensive construction. The extractor includes a bowl 80 having a plurality of annular frusto conical discs 81 therein. Light liquid is introduced through a center tube 82 and passes down the path 83 between the bowl and the conical member 84. It then passes up through the outer distributing channels 85 and is distributed to the spaces between the conical discs 81, normally flowing inwardly along the upper surfaces of the conical discs. The heavy liquid is introduced through the tube 86 placed about the light liquid tube 82. It is deflected by the conical member 87 and passes through the channel 88 provided between the tubular members 89 and 90. The member 90 joins the conical member 84 which terminates the passage. The heavy liquid is then applied to the distributing channels 91 which distribute the heavy liquid to the spaces between the discs 81.

The distributing channels 85 and 91, may be shaped as shown in FIG. 16. The channels are of elliptical cross section with openings 93 which discharge into the spaces between discs. The heavy liquid is forced outwardly from the channels 91 by the centrifugal force and follows the under surface of the discs 81. Considering as an example the disc 81a, the heavy liquid moves along the bottom surface as shown by the solid arrow while the light liquid moves along the upper surface of this disc as shown by the dotted arrow. The discs are perforated and the light and heavy liquids tend to pass through the apertures 92 therein in opposite directions. More specifically, the heavy liquid tends to move upwardly through the apertures, as through aperture 92a, and the light liquid tends to move downwardly therethrough. This provides turbulence, mixing and drop reformation to thoroughly mix the heavy and light liquids. After passing through the openings the liquids will then move along the discs in the spaces between openings and the liquids are separated as the heavy liquid moves to the under surface and the light liquid moves to the upper surface of the discs.

As the heavy liquid moves outwardly along the under surfaces of the conical discs, it will pass below the upper surface of the disc and will be discharged from the outer edge of the discs to the passage 94 between the bowl and the conical member 95. The light liquid is discharged from the inner edges of the discs up through the passage 96 between the members 95 and 89.

The members 84 and 90 may be constructed to provide a recess 97 in the inlet path for the heavy liquid. Solids in the heavy liquid will be deposited in this recess and not pass through the spaces between the discs. This recess may be connected to a mechanism to discharge the solids.

The construction of the conical discs 81, including the size and spacing of the openings therein, controls the mixing and separating action. The inclination of the distributor channels, and the size of the discharge openings therein, control the percentage of the fluid which passes between the various stacked discs. As the radius increases the centrifugal or separating force will increase so that the diameter of the perforations can be decreased and/or the spacing between the perforations can be shortened to provide more mixing zones and to shorten the separating space between zones. This provides more effective operation in a given size machine.

As previously stated the extractor of FIG. 15 is extremely simple as the discs are of simple frusto conical shape with no ribs or rings between the discs. The openings can be accurately punched out to provide the mixing passages. This structure can handle liquids with some solids.

FIG. 16 also shows a further embodiment in which the spaced radial guiding vanes or ribs 102 provided on the frusto conical discs are discontinuous to form a partial radial baffle between the discs. These vanes, like the vanes 40 of FIG. 3, prevent slippage of the liquids between the discs by accelerating the peripheral velocity of the heavy liquid on its radial way out, and decelerating the peripheral velocity of the lighter liquid on its radial way inward. At the points of discontinuity in the vanes, the light liquid runs ahead and the heavy liquid runs behind. These velocities being opposite in direction cause turbulence and mixing of the light and heavy liquids. Such a construction may be used with the various embodiments and may be used as the sole means producing turbulence, or may be used in combination with other means.

In FIG. 17 there is illustrated an extractor constructed generally similar to that of FIG. 15, except that circular rings 98 are provided between the adjacent discs. There are no perforations in the discs and the heavy liquid as it moves outwardly and the light liquid as it moves inwardly pass through openings 99 in the circular discs causing turbulence which produces mixing action and drop reformation as the liquids engage each other passing through the openings. This permits a greater number of extraction stages within a given size bowl and a more uniform distribution of the liquids in the spaces between the discs.

It is apparent that various other constructions can be used instead of the circular rings between the adjacent discs. For example, bosses may be provided between the conical discs similar to the bosses shown in FIGS. 12 and 13 in the device having cylindrical discs. The rings may be constructed as shown in FIG. 18 wherein the ring 100 extends outwardly from the disc in the path of the light liquid so that the light liquid must move around the ring and mix with the heavy liquid on the under side of the adjacent disc. As in the prior embodiments, the light liquid is shown by dotted arrows and the heavy liquid by solid arrows. FIG. 18 also shows a ring 101 which is connected to the under side of a conical disc so that the heavy liquid must move down under the edge of the ring and engage the light liquid on the adjacent disc. The ring 101 is shown with a rough edge which increases the mixing action of the light and heavy liquids.

The present invention thus provides relatively simple and compact mixing and separating apparatus for liquids of different densities. By providing a plurality of mixing spaces between adjacent spaced-apart plates, small volumes of liquid are contacted separately and good mixing is ensured. The provision of the rising channels offers a relatively simple distribution means for the liquid components. The various turbulence-producing means described make a multi-stage operation possible by providing a number of separate mixing and separating zones for the components which substantially improves the efficiency of mixing without unduly complicating the mechanical structure of the device.

Although the apparatus has been illustrated and described as rotatable about a vertical axis, it will be understood that it is equally operative when positioned with the central axis of rotation horizontal.

I claim:

1. In centrifugal countercurrent contact apparatus for effecting intimate contact between liquids which are at least partially immiscible, a rotary bowl having a central axis and an interior working space, a plurality of spaced apart annular frusto conical discs within the working space and extending outwardly from said central axis of said bowl and rotatable therewith, a plurality of aligned openings in said discs, tubular distributing channel members extending through said aligned openings in said discs forming at least two channels within the working space including a first channel member relatively close to said central axis and a second channel member relatively remote from said central axis, said first channel member being in a plane including said central axis and inclined outwardly with respect to said central axis from one end thereof, said second channel member being in a plane including said central axis and inclined inwardly with respect to said central axis from the one end thereof adjacent to said one end of said first channel member, said tubular channel members being of substantially uniform cross section with open portions for discharging liquid therefrom into the spaces between said discs, with said open portions in said first channel member being directed away from said central axis annd said open portions in said second channel member being directed toward said central axis, means for introducing heavy liquid into said first channel member at said one end thereof to be distributed between said discs, means for introducing light liquid into said second channel member at said one end thereof to be distributed between said discs, said discs including a plurality of portions positioned between the inner and outer edges thereof and between said first and second channel members to cause mixing of the liquids flowing through the spaces between said discs, the light and heavy liquids separating while passing from one mixing portion to another to provide a plurality of mixing and separating sections along each disc between the inner and outer edges thereof, means adjacent the inner edges of said discs for receiving the separated light liquid, and means adjacent the outer edges of said discs for receiving the separated heavy liquid.

2. The structure of claim 1 wherein said portions of said discs for causing mixing of the light and heavy liquids flowing through the spaces between said discs are spaced closer to each other at axial positions near the outer edges of said discs as compared to the spacing thereof near the inner edges of said discs.

3. The structure of claim 1 wherein said portions of said discs for causing mixing of the light and heavy liquids include openings in said discs through which the light and heavy liquids flow in opposite directions to provide turbulence and mixing thereof.

4. The structure of claim 1 wherein said portions of said discs for causing mixing of the light and heavy liquids flowing through the spaces between said discs includes portions projecting from one disc toward the adjacent disc.

5. The structure of claim 1 wherein said portions of said discs for causing mixing of the light and heavy liquids flowing through the spaces between said discs include corrugations in said discs.

6. The structure of claim 1 wherein said discs include radial guiding vanes positioned axially between the inner and outer edges of said discs, with said vanes being discontinuous to provide spaces therebetween in which the heavy liquid accelerates and the light liquid decelerates, to thereby cause mixing of the liquids flowing through the spaces between said discs.

References Cited in the file of this patent
UNITED STATES PATENTS

| | | |
|---|---|---|
| 621,619 | Salenius | Mar. 21, 1899 |
| 901,149 | Bragg | Oct. 13, 1908 |
| 993,791 | Ohlsson | May 30, 1911 |
| 1,006,622 | Bailey | Oct. 24, 1911 |
| 2,028,955 | Shenstone | Jan. 28, 1936 |
| 2,301,109 | Clayton | Nov. 3, 1942 |
| 2,313,541 | Flowers | Mar. 9, 1943 |
| 2,665,061 | Steinacker et al. | Jan. 5, 1954 |
| 3,027,390 | Thurman | Mar. 27, 1962 |